March 25, 1930.   A. E. MILLER   1,751,521
POST HOLE DIGGER AND REAMER
Filed March 29, 1929   2 Sheets-Sheet 2
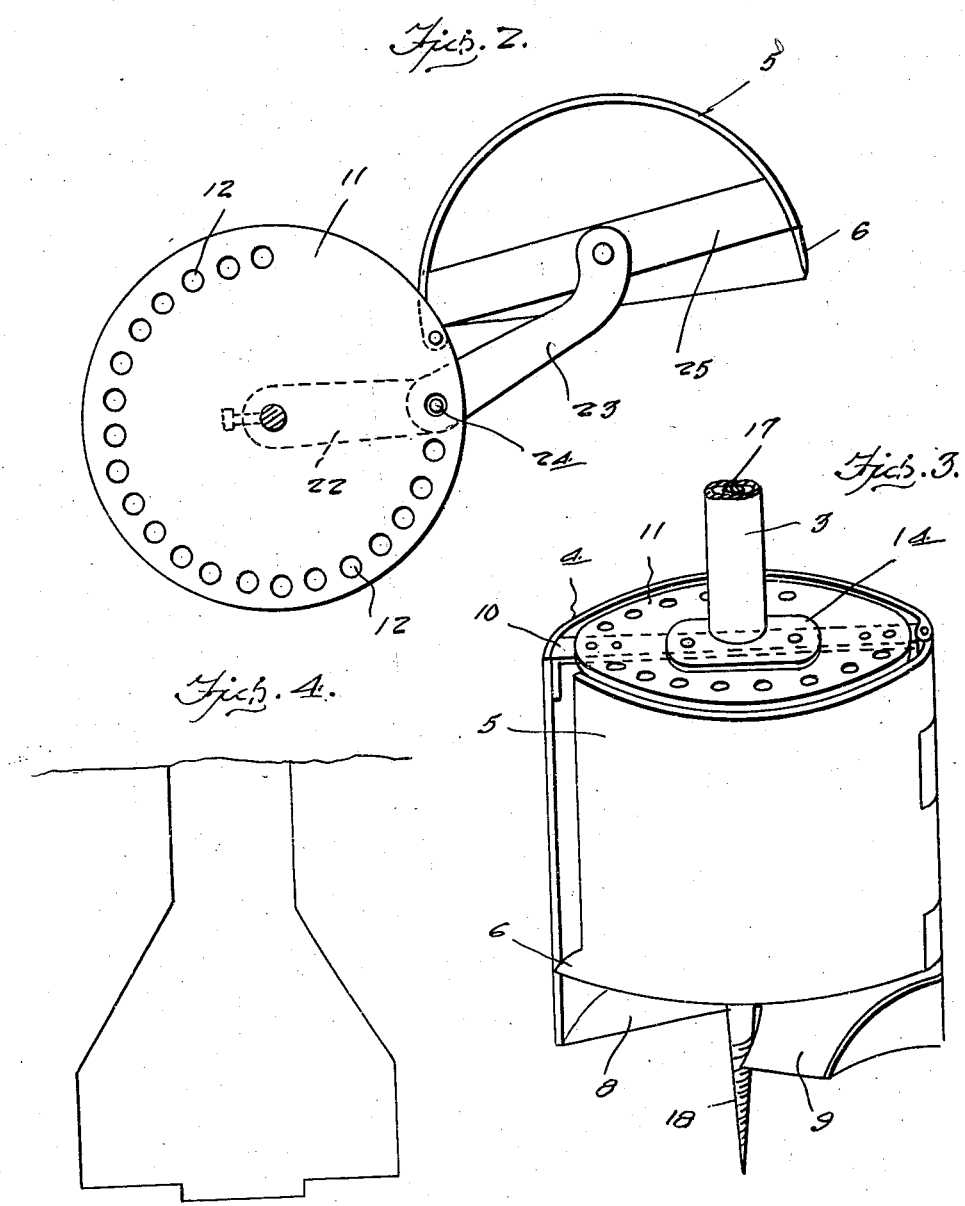
Inventor
Arthur E. Miller
By Clarence A. O'Brien
Attorney Patented Mar. 25, 1930

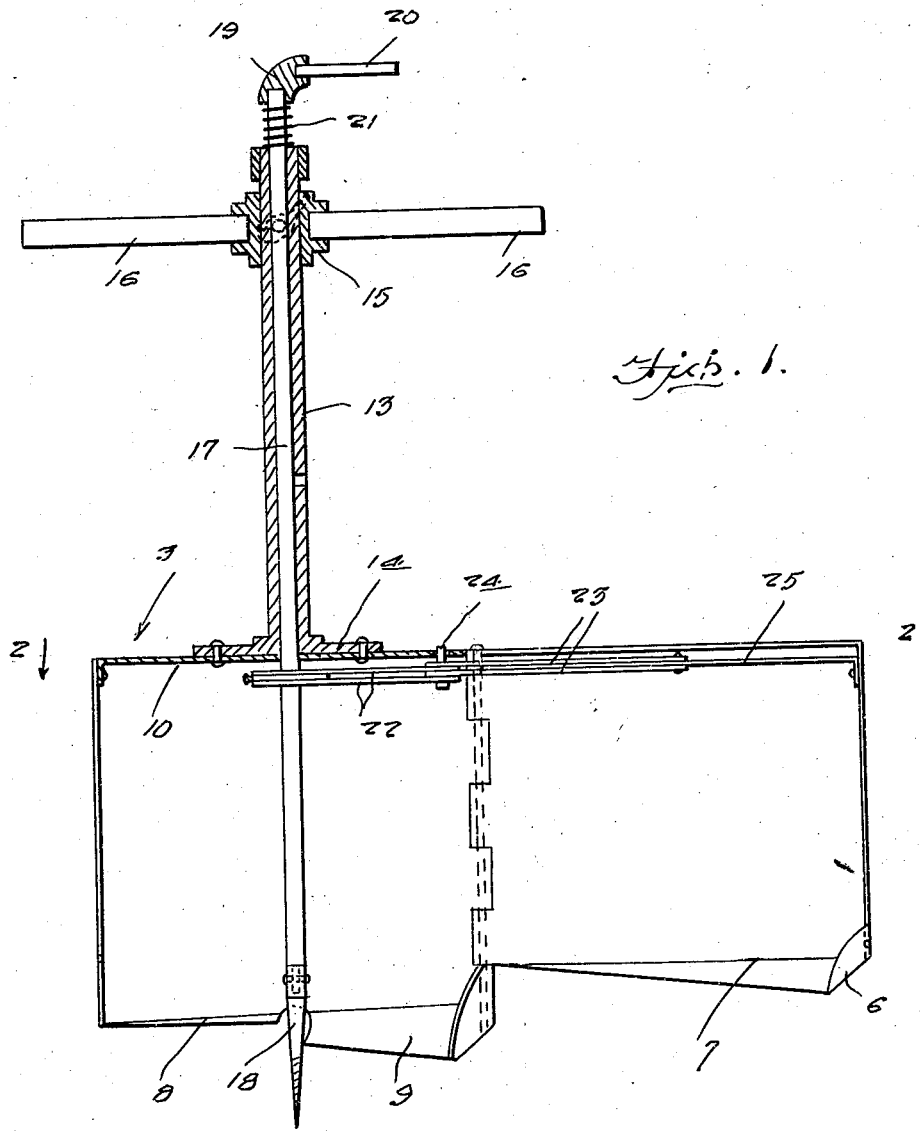

1,751,521

UNITED STATES PATENT OFFICE

ARTHUR EUGENE MILLER, OF HOUSTON, TEXAS

POST-HOLE DIGGER AND REAMER

Application filed March 29, 1929. Serial No. 350,993.

This invention relates to new and useful improvements in diggers and more particularly to a novel post hole digger of the adjustable type. The primary object of this invention is to provide a digger of this character capable of being continually operated and adjusted to increase the size of the openings as the digger is sunk into the ground.

Another important object of the invention is to provide a digger wherein the cutter element thereof may be expended without removing the digger from its cutting position.

Another important object is to provide a digger of this nature which because of its brief construction can be manufactured at low cost.

In the drawings:

Figure 1 represents a vertical sectional view through the digger, showing the cutting blade in expanded position.

Figure 2 represents a horizontal sectional view, taken substantially on the line 2—2 of Figure 1, looking downwardly.

Figure 3 represents a fragmentary perspective view showing the cutting head of the digger.

Figure 4 is a diagrammatic view showing a peculiar shaped opening which can be made by the novel implement.

Referring to the drawings wherein like numerals designate like parts, the invention includes a head generally referred to by numeral 3 and includes a stationary section 4 of arcuate shape, to one edge portion of which is secured a hinged wing 5, which consists in construction of an arcuate plate with a cutting blade 6 protruding from the lower portion of its free end.

The wing 5 has a floor 7, the edge portion of which extends out to the pointed end of the blade 6, as clearly shown in Figure 1.

The arcuate stationary section 4 is provided with a floor 8 merging into a chute 9, at the edge portion of the section to which the wing 5 is hinged.

A cross piece 10 secured within the upper portion of the section 4 supports a circular plate 11 provided with a multiplicity of spaced openings 12, arranged around the edge portion thereof. An elongated tubular handle 13 is provided with a flange 14 at its lower end for attachment to the cross piece 10, in the manner shown in Figure 3. A hub 15 is secured to the upper portion of the handle 13, and has handle bars 16—16 projecting therefrom.

An elongated rod 17 is disposed through the hollow handle 13 and head 3 and is equipped with a detachable screw bit 18 at its lower ends. The upper end of the rod 17 projects above the upper end of the handle 13, and has an elbow 19 secured thereto with a hand lever 20 projecting therefrom.

A coiled spring 21 is interposed between the upper end of the hollow handle 13 and the said elbow 19.

An arm 22 consisting of a pair of spaced plates projects from the rod 17 within the head 3. A link 23 also consisting of a pair of plates is pivotally connected to the arm 22 by a pin 24, which is normally engaged within one of the openings 12 by means of the spring 21 tending to urge the rod 17 in an upward position. A bracket 25 projecting from the free end portions of the wing 5 has the opposite end of the link 23 pivotally connected thereto.

Obviously, by closing the head 3 and engaging the screw bit 18 into the ground and rotating the handle 13, the rotation of the head will cause the scoop 9 to bite into the ground.

After the hole has been started and it is desired to enlarge the same, the hand lever 20 may be actuated to rotate the rod 17 which results in the movement of the arm 22 and link 23 for swinging the wing 5 outwardly from the stationary section 4.

By releasing the hand lever 20, the spring 21 will urge the rod 17 upwardly resulting in the engagement of the spring 24 within one of the openings 12.

While the foregoing description has been couched in general terms, it is to be understood that numerous changes in the specific shape, size, and materials may be resorted to, without departing from the spirit and scope of the invention as claimed hereinafter.

Having described the invention, what is claimed as new is:

A post hole digger comprising an expansible head, a hollow handle extending from the head, a rod extending through said handle, and means connecting the rod to the expansible head, whereby the head may be adjusted, said head including a pivotal blade and said means consisting of an arm projecting from the rod, a pivotal pin connection between the said arm and the said pivotal blade, and adjustable means whereby the blade may be retained in an adjusted position, said means consisting in providing the head with a plurality of openings, said pivotal pin being adapted to engagement in one of the said openings.

In testimony whereof I affix my signature.

ARTHUR EUGENE MILLER.